Feb. 6, 1945. W. FLEENOR 2,368,818
MOLDING APPARATUS
Filed Nov. 12, 1942 5 Sheets-Sheet 1
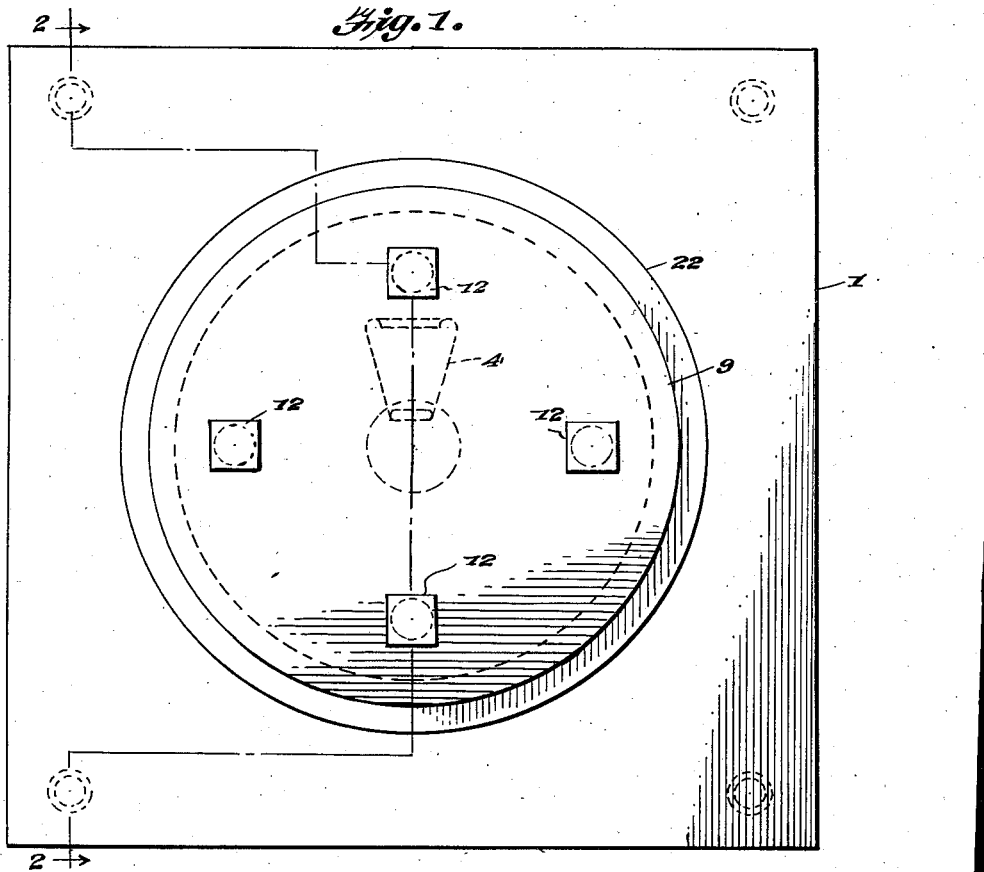
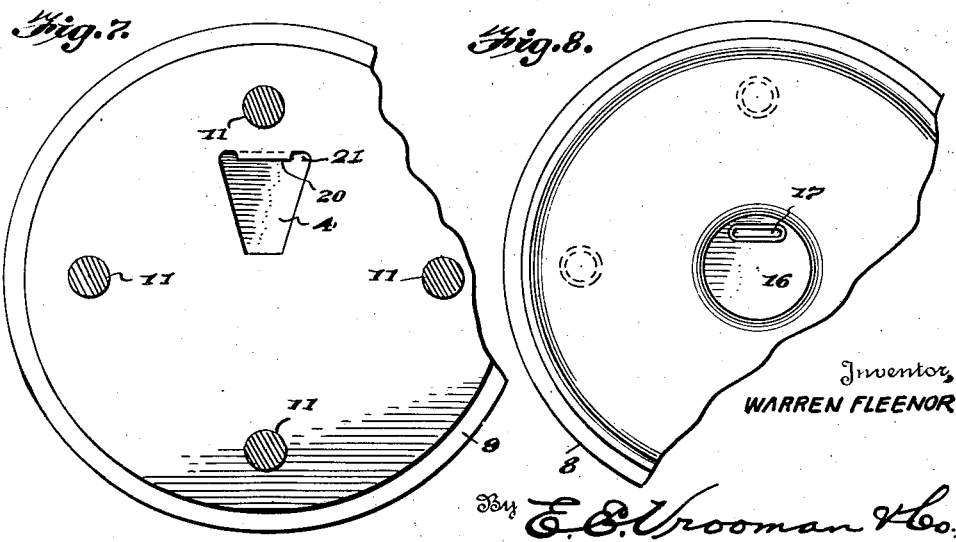
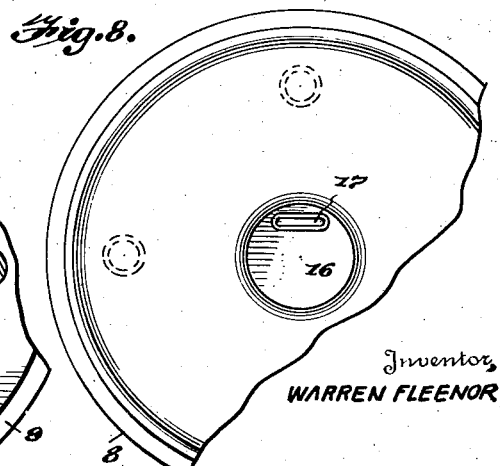
Inventor,
WARREN FLEENOR,
By E. E. Vrooman & Co.,
His Attorneys.

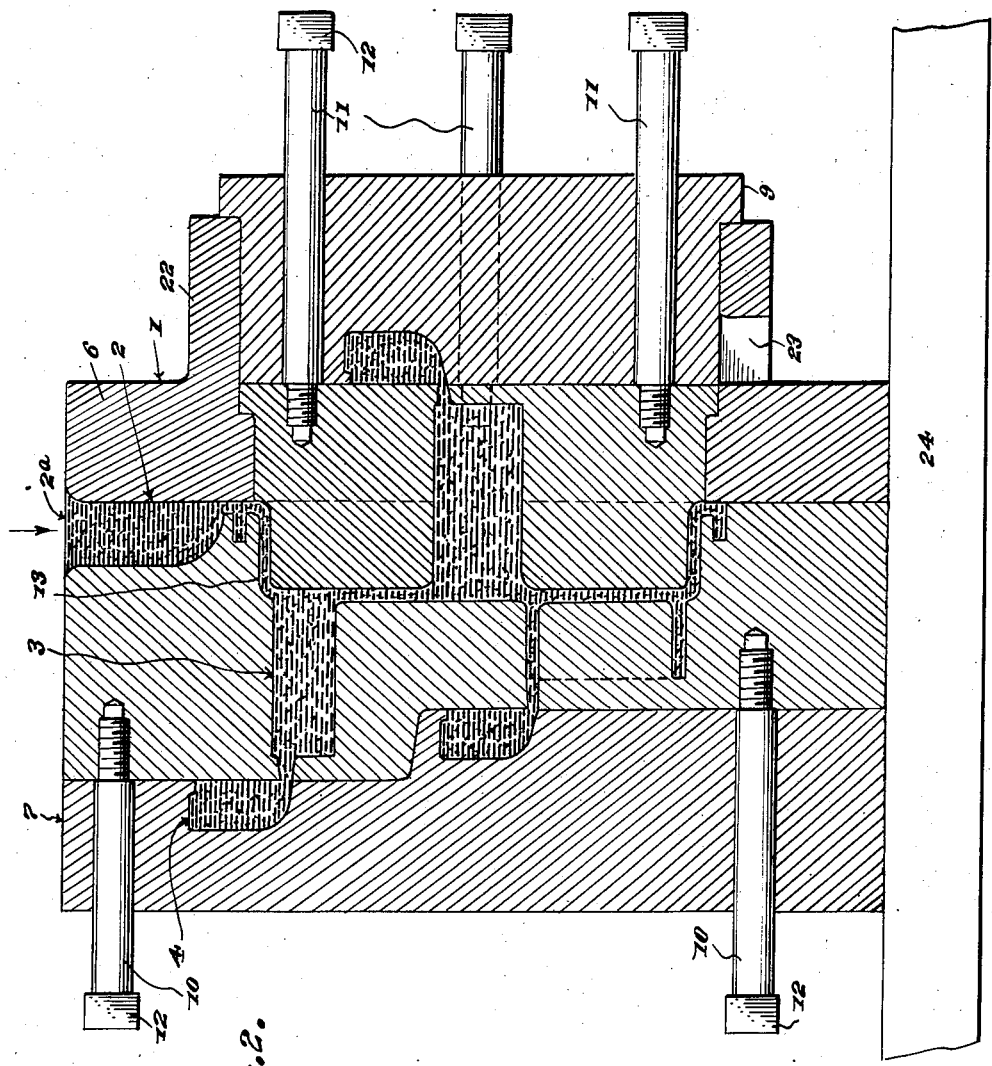

Feb. 6, 1945.    W. FLEENOR    2,368,818
MOLDING APPARATUS
Filed Nov. 12, 1942    5 Sheets-Sheet 3
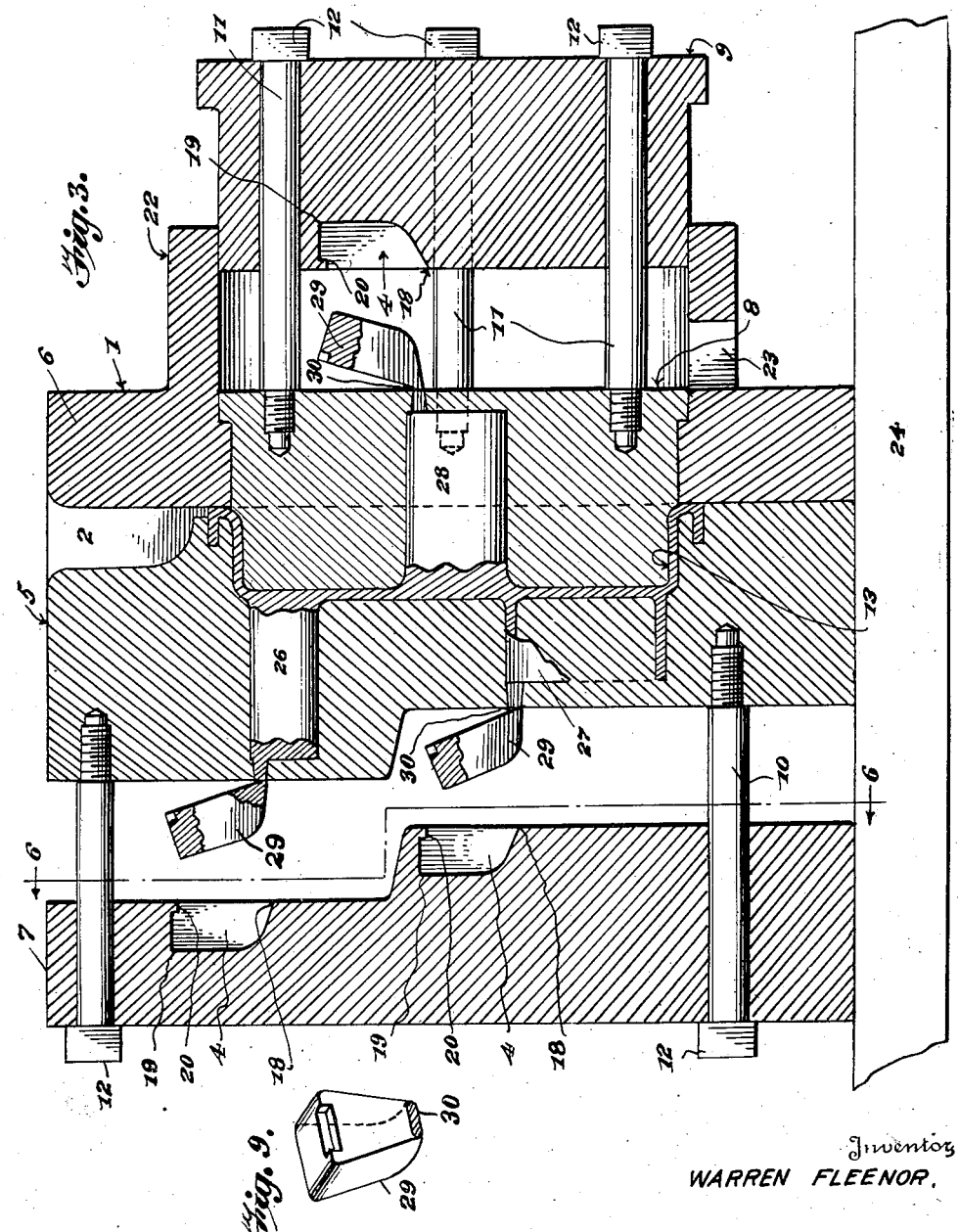
Inventor
WARREN FLEENOR.

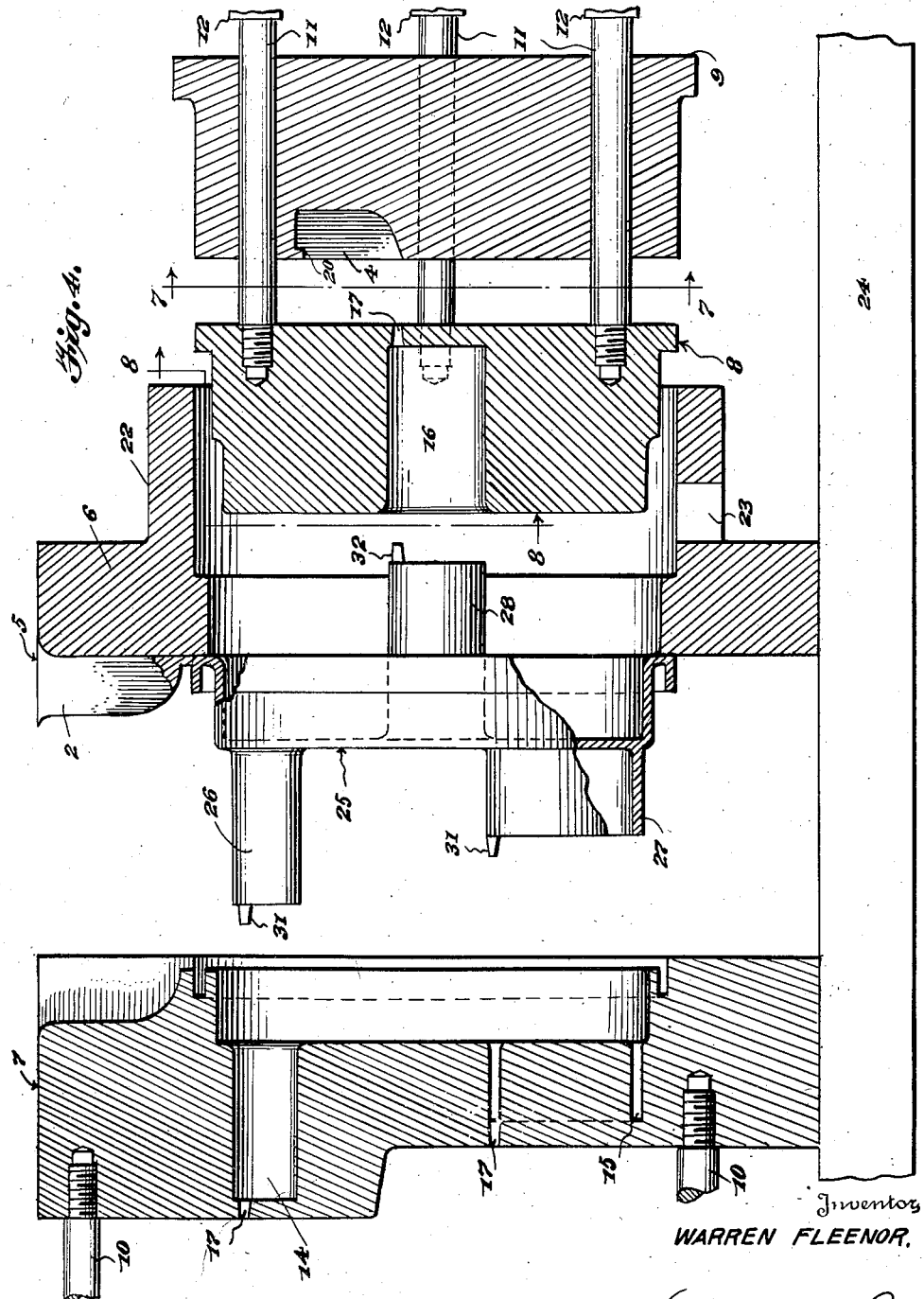

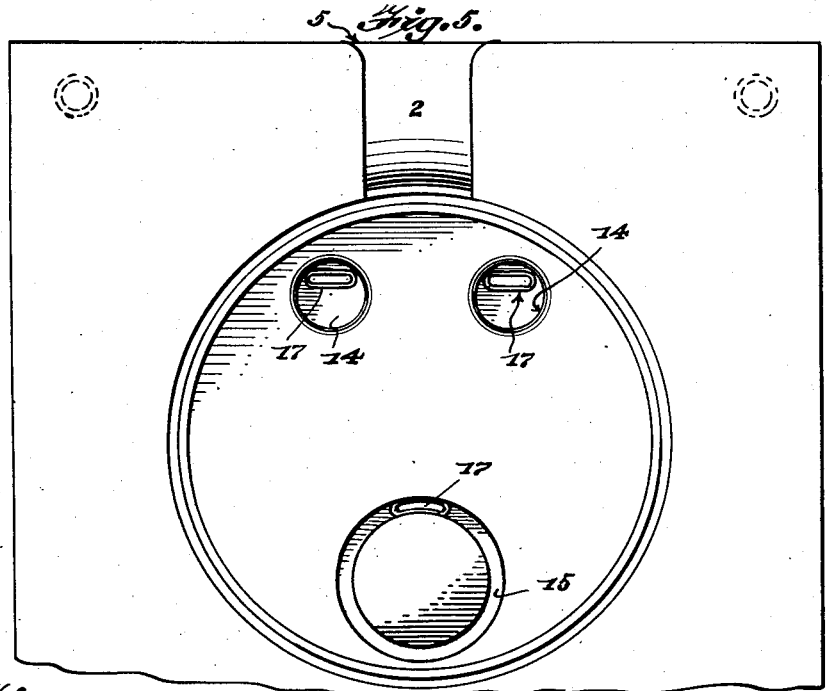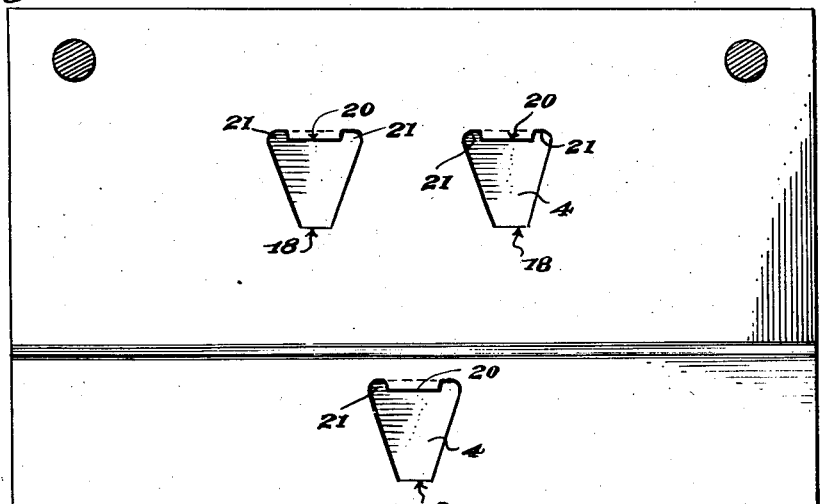

Patented Feb. 6, 1945

2,368,818

UNITED STATES PATENT OFFICE 2,368,818

MOLDING APPARATUS

Warren Fleenor, Stafford, N. Y.

Application November 12, 1942, Serial No. 465,339

5 Claims. (Cl. 22—136)

This invention relates to a molding apparatus, by which castings are made in accordance with the universally known process called permanent molding or gravity die casting. In this process one sometimes must produce a difficult part or casting in which it is necessary to provide a bulk of material at some spot on the part to take care of the excessive shrinkage due to the cooling of the molten material. In adding these bulks of material ("risers" as they are rightfully called) one must design and build the molding apparatus in such a novel way as to permit removal of the cast part from the mold. Some designs of parts are so difficult that it is almost impossible to design and build a molding apparatus so that risers can be placed at points where excessive shrinkage will occur.

Therefore, an object of this invention is the novel construction of a molding apparatus so that a riser can be placed anywhere necessary upon the casting and be removed before the molded casting is removed from the molding apparatus.

Another object of the invention is the construction of a simple and efficient molding apparatus to take care of the excessive shrinkage on a casting, due to the cooling of the molten material.

With the foregoing and other objects in view, my invention comprises certain novel constructions, combinations and arrangements of parts as will be hereinafter fully described, illustrated in the accompanying drawings, and more particularly pointed out in the appended claims.

In the drawings:

Figure 1 is a view in elevation of the right hand end of the molding apparatus.

Figure 2 is a sectional view taken on line 2—2, Figure 1, and looking in the direction of the arrows.

Figure 3 is a vertical longitudinal sectional view, showing the left hand or auxiliary mold section in its outer or moved position.

Figure 4 is a vertical longitudinal sectional view, showing the mold sections of the molding apparatus removed from a closed or operating position, and showing the casting or molded article ready to be removed.

Figure 5 is a fragmentary view in elevation of the inner face of the intermediary mold section of the molding apparatus.

Figure 6 is a fragmentary sectional view, taken on line 6—6, Figure 3, and looking in the direction of the arrows.

Figure 7 is a fragmentary sectional view taken on line 7—7, Figure 4, and looking in the direction of the arrows.

Figure 8 is a view taken on line 8—8, Figure 4, and looking in the direction of the arrows.

Figure 9 is a perspective view of a riser from one of the riser cavities.

Referring to the drawings, in which I have shown the preferred embodiment of my invention, 1 designates the body of the apparatus as a whole, in which body is a gate cavity 2 communicating with a molding cavity 3 (Fig. 2). A plurality of novel pocket-like riser cavities 4 communicates with different parts of the molding cavity 3, as hereinafter specifically described.

The body 1 comprises intermediate mold section 5 (Fig. 3), right hand or primary mold section 6, left hand or auxiliary mold section 7, core mold section 8, and plug mold section 9. The gate cavity 2 is provided with a suitable pouring gate 2a. Pick-up bolts 10 and 11 are provided, each bolt having a head 12 on its outer end. The inner ends of the pick-up bolts 10 and 11 are screw threaded for the purpose hereinafter described.

The auxiliary mold section 7 is slidably mounted upon the pick-up bolts 10, the inner threaded ends of said bolts being threaded into the intermediary mold section 5 as clearly shown in Figure 3. The plug or cap mold section 9 is slidably mounted upon pick-up bolts 11 with the inner ends of said bolts threaded into the core mold section 8, as shown.

The molding cavity 3 of body 1 comprises molding recess 13, cylindrical recess 14, annular recess 15, and cylindrical recess 16. Riser cavities 4 are formed in the inner-face portions of the auxiliary mold section 7 and the cap mold section 9, and communicate by horizontal elongated feeding ducts 17 with the top or upper portion of the recesses 14, 15 and 16 of the molding apparatus.

Each pocket-like riser cavity 4 is closed at its top and is gradually curved or dished inwardly from its lower outer edge 18 to its upper inner end 19, and is provided on the outer edge of the closed top with a depending elongated breaker tooth 20; the breaker tooth 20 has clearance openings 21 at its ends (Fig. 6) for the highly efficient operation obtained by my molding apparatus. It is, therefore, to be understood that the breaker tooth 20 depends into the opening of the riser cavity 4.

The primary mold section 6 is provided with an annular sleeve 22 (Fig. 3), and said sleeve is provided in its lower portion with an opening 23. The cap mold section 9 is adapted to slidably engage the inner face of annular sleeve 2 during the adjustment of said cap mold section upon the apparatus. The sections 5, 6 and 7 are mounted on a suitable base 24, with sections 5 and 7 adapted to move bodily upon said base 24 during the operation of the apparatus.

It is to be understood that the casting or molded article 25 (Fig. 4) is merely shown to illustrate the operation of the apparatus as the same principle herein described may be followed in the construction of an apparatus for forming or molding any type of an article or casting. Further protruding bosses 26, 27 and 28, by reason of their distance from the pouring gate 5, will require the risers 29 (Fig. 9) to be formed on the ends of said bosses so that when the molten material in the molding cavity 3 (Fig. 2) begins to cool, it will also begin to shrink and since the risers are still of molten material, this material will flow into the shrinking part, thus making a solid part free from blow holes, shrink cracks, and a crystallized section.

When the molten material in all the riser cavities 4 has solidified enough for rigidity, the process of removing the casting begins. Auxiliary mold section 7 is moved to the left by some suitable mechanism, such as a hydraulic or air cylinder or by hand levers (not shown) until it is stopped by the bolt heads 12 on the pick-up bolts 10. In moving auxiliary mold section 7 (Fig. 3) it will cause the risers 29 in the riser cavities 4 of the auxiliary mold section 7 to drag, due to the breaker teeth 20, and will cause said risers to break off at 30 from the casting, causing sharp corners 31 (Fig. 4); the risers 29 then fall, by reason of the self-clearing action in each riser cavity, to the base 24 to be removed from said base by hand. Next cap mold section 9 is moved until it is stopped by the bolt heads 12 on pick-up bolts 11, which bolts are threaded into the core mold section 8. In moving cap mold section 9 it will cause the riser 29 in the riser cavity 4 of the cap mold section 9 to drag, due to the breaker tooth 20 of this riser cavity, which will break off said riser from the portion of the casting in recess 16, leaving the sharp corner 32, whereupon this particular riser will fall to base 24 through the opening 23 and be removed by hand. It is to be understood that the corners 31 and 32 are caused or formed by the feeder ducts 17.

After the auxiliary mold section 7 and cap mold section 8 have been moved to their extreme outer position on the pick-up bolts, as shown in Figure 3, power is applied to said parts, not only to move intermediary section 5 away from the casting 25 (Fig. 4), but also to cause the withdrawing of the core mold section 8 from within the primary mold section 6, as clearly shown in Figure 4, whereupon the casting 25 will be free for removal from the molding apparatus. The unnecessary corners and protuberance, such as the corners 31 and 32, can be removed easily in any preferred manner from the finished casting.

By any suitable power the mold sections of the open apparatus (Fig. 4) can be likewise closed together for the pouring of the molten material into the pouring gate 2 and thence into the molding cavity 3.

The peculiar and essentially novel structure of each riser cavity produces the self-cleaning or removing action for the riser after it has solidified and is to be removed from the cavity, as hereinbefore specifically described, prior to the removal of the finished article or casting.

The mold sections of the molding apparatus are preferably made of steel, or as some jobbers use, Meehanite cast iron, into which can be poured molten aluminum, zinc, or magnesium.

It is to be understood that the boss 26 is formed in the cylindrical recess 14; annular or hollow boss 27 is formed in the annular recess 15 (Fig. 4); and the solid boss 28 is formed in the cylindrical recess 16 of the unit 8. The casting 25 is specifically shown with the necessary parts of the mold for producing the same, merely to illustrate the carrying out of a practical way for producing a molded article or casting, in accordance with the present invention.

I refer to the "body" in a broad sense, the body in the present embodiment being made up of several peculiarly constructed mold sections, as hereinbefore described.

While I have described the preferred embodiment of my invention and illustrated the same in the accompanying drawings, certain minor changes or alterations may appear to one skilled in the art to which this invention relates, during the extensive manufacture of the same and I, therefore, reserve the right to make such alterations or changes as shall fairly fall within the scope of the appended claims.

What I claim is:

1. In a molding apparatus, the combination of end sections and central sections between said end sections, said central sections only being provided with a gate cavity and a molding cavity, means forming communication between said molding and gate cavities, riser cavities in the inner faces only of said end sections and completely closed when all of the sections are together, and said central sections being provided with feeding ducts opening at their outer ends into said riser cavities and at their inner ends into said molding cavity.

2. In a molding apparatus, the combination of a body provided with a molding cavity, said body also provided with a riser cavity closed at its top, said riser cavity being provided with a depending elongated breaker tooth at its upper front edge, said breaker tooth having open spaces at its ends, and an elongated feeder duct in said body forming a communication between the lower end of said riser cavity and said molding cavity.

3. In a molding apparatus, the combination of a body comprising a vertical primary mold section and a separable vertical intermediary mold section, said primary mold section being provided with a horizontal annular sleeve, said sleeve being provided in its bottom portion with a vertical opening, said primary and intermediary mold sections being provided with a molding cavity, a horizontally-movable core mold section slidably mounted in said annular sleeve and having a portion forming part of said molding cavity, horizontal pick-up bolts threaded at their inner ends into said core mold section and extending outwardly through said horizontal annular sleeve, a cap mold section slidably mounted on said pick-up bolts and movable horizontally within said sleeve, said cap mold section being provided with a riser cavity in communication with said molding cavity, horizontal pick-up bolts threaded at their inner ends into said intermediary mold section, a vertical auxiliary mold section slidably mounted on said last-mentioned pick-up bolts, and riser cavities in said auxiliary mold section and in communication with said molding cavity.

4. In a molding apparatus, the combination of a body comprising a primary mold section and a separable intermediate mold section, said primary mold section being provided with an annular sleeve, said sleeve being provided in its bottom with an opening, said primary and intermediate mold sections being provided with a molding cavity, a core mold section slidably mounted in said annular sleeve and having a portion forming part of said molding cavity, horizontal pick-up bolts threaded at their inner ends into said core mold section and extending outwardly through said annular sleeve, a cap mold section slidably mounted on said pick-up bolts and movable within said sleeve, said cap mold section being provided with a riser cavity in communication with said molding cavity, pick-up bolts threaded at their inner ends into said intermediary mold section, an auxiliary mold section slidably mounted on said last-mentioned pick-up bolts, and riser cavities in said auxiliary mold section and in communication with said molding cavity.

5. In a molding apparatus, the combination of a body comprising a primary mold section, an intermediary mold section normally in contact with one side of said primary mold section, a core mold section normally within said primary mold section, pick-up bolts detachably secured in the outer side of said intermediary mold section, an auxiliary mold section slidably mounted on said pick-up bolts and being adapted to fit snugly against the outer face of said intermediary mold section, pick-up bolts secured in the outer portion of said core mold section, a cap mold section slidably mounted on said last-mentioned pick-up bolts and being adapted to fit tightly against the outer face of said core mold section, said primary and intermediary sections being provided with a molding cavity and a gate cavity in communication with said molding cavity, and said auxiliary and cap mold sections being provided with riser cavities in communication with said molding cavity.

WARREN FLEENOR.